(12) United States Patent
Chang (10) Patent No.: US 12,467,545 B1
(45) Date of Patent: Nov. 11, 2025

(54) CERAMIC BALANCING CHECK VALVE

(71) Applicant: HAIN YO ENTERPRISES CO., LTD.

(72) Inventor: Chia-Po Chang, Hemei Township, Changhua County (TW)

(73) Assignee: HAIN YO ENTERPRISES CO., LTD., Changhua County (TW)

( * ) Notice: Subject to any disclaimer, the term of this patent is extended or adjusted under 35 U.S.C. 154(b) by 0 days.

(21) Appl. No.: 18/752,783

(22) Filed: Jun. 24, 2024

(51) Int. Cl.
  *F16K 11/074* (2006.01)
  *F16K 15/18* (2006.01)
  *F16K 25/04* (2006.01)

(52) U.S. Cl.
  CPC ........ *F16K 11/0743* (2013.01); *F16K 15/184* (2021.08); *F16K 25/04* (2013.01); *Y10T 137/2521* (2015.04); *Y10T 137/7929* (2015.04); *Y10T 137/7933* (2015.04); *Y10T 137/87249* (2015.04)

(58) Field of Classification Search
  USPC .............................. 137/100, 540, 543, 597
  See application file for complete search history.

(56) References Cited

U.S. PATENT DOCUMENTS

| | | | | |
|---|---|---|---|---|
| 3,987,819 | A * | 10/1976 | Scheuermann | F16K 11/18 137/636.2 |
| 5,402,827 | A * | 4/1995 | Gonzalez | F16K 11/0787 137/271 |
| 8,322,377 | B2 * | 12/2012 | Di Nunzio | F16K 11/02 239/408 |
| 8,375,974 | B2 * | 2/2013 | Yan | F16K 11/0743 251/118 |
| 10,281,935 | B2 * | 5/2019 | Ye | G05D 23/1313 |

* cited by examiner

*Primary Examiner* — Matthew W Jellett

(57) ABSTRACT

A ceramic balancing check valve has a valve housing, a controller, a balancing valve unit, and a check valve unit. The valve housing has a main body having two side drainage holes, a control rod. The controller has an upper ceramic plate, a lower ceramic plate, and a base, the lower ceramic plate secured on the base, the upper ceramic plate capable of rotating relative to the lower ceramic plate. The control rod is capable of rotating and driving the upper ceramic plate. The upper ceramic plate has a side outlet aligned with the side drainage hole and a bottom outlet. The lower ceramic plate has two first hot intake holes and two first cold intake holes and further has a first hot and cold outlet. The base has a second hot intake hole, a second cold intake hole, and a second hot and cold outlet.

5 Claims, 13 Drawing Sheets

CERAMIC BALANCING CHECK VALVE

BACKGROUND OF THE INVENTION

Field of Invention

The present invention relates to a water balancing check valve, and more particularly to a ceramic balancing check valve.

Description of the Related Art

Ceramic valves have been widely used in bathroom equipment, For example, the faucets of shower equipment are commonly used equipment. In such cases, ceramic valves may need to mix hot and cold water, and switch the direction and output mode of water. Moreover, the complicated movements of each component will also produce a lot of noise and wear, therefore, it is necessary to simplify the operation of the ceramic valve. In addition, the stability of the water output is also very important.

Therefore, it is desirable to provide a ceramic balancing check valve to mitigate and/or obviate the aforementioned problems.

SUMMARY OF THE INVENTION

An objective of present invention is to provide a ceramic balancing check valve, which is capable of improving the above-mention problems.

In order to achieve the above-mentioned objective, Other objects, advantages, and novel features of invention will become more apparent from the following detailed description when taken in conjunction with the accompanying drawings.

DETAILED DESCRIPTION OF PREFERRED EMBODIMENT

First, please refer to FIGS. 1-8. A ceramic balancing check valve comprises: a valve housing 10, a controller 20, a balancing valve unit 30 and a checking valve unit 40. The valve housing 10 has a main body 11 having a hollow bottom and further having two side drainage holes 111, a control rod 12 is pivotally disposed on a top of the main body 11. The controller 20 has an upper ceramic plate 21, an lower ceramic plate 22 and a base 23. The lower ceramic plate 22 is secured onto the base 23, and the upper ceramic plate 21 is capable of rotating relative to the lower ceramic plate 22. The base 23 is secured at the bottom of the main body 11, and the upper ceramic plate 21 and the lower ceramic plate 22 are place in the main body. The control rod 12 is capable of rotating and driving the upper ceramic plate 21. The upper ceramic plate 21 has a side outlet 211 aligned with the side drainage hole 111 and a bottom outlet 212. The lower ceramic plate 22 has two first hot intake holes 221 and two first cold intake holes 222 and further has a first hot and cold outlet 223. The base 23 has a second hot intake hole 231, a second cold intake hole 232 and a second hot and cold outlet 233. The controller 20 has the balancing valve unit 30 and the checking valve unit 40, the balancing valve unit has a balancing valve base 31 and a balancing valve 32, the balancing valve base 31 has a balancing hot intake hole 311, a balancing cold intake hole 312 and a balancing hot and cold outlet 313 on a top surface, and the balancing valve base 31 and the balancing valve 32 are combined together. The checking valve unit 40 has a checking valve base 41 and two checking valves 42. The checking valve base 41 has a checking hot intake hole 411, a checking cold intake hole 412 and a checking hot and cold intake hole 413, and the checking cold intake hole 412, the checking hot intake hole 411 respectively have a checking valve 42.

Figure 10:
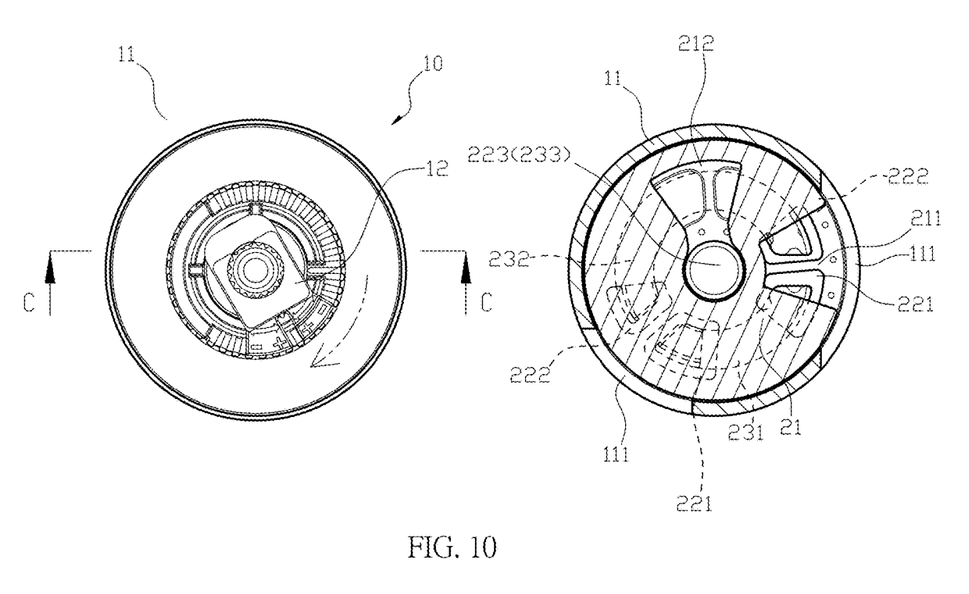
FIG. 10 is a schematic drawing of the usage state of the preferred embodiment according to present invention.
Figure 11:
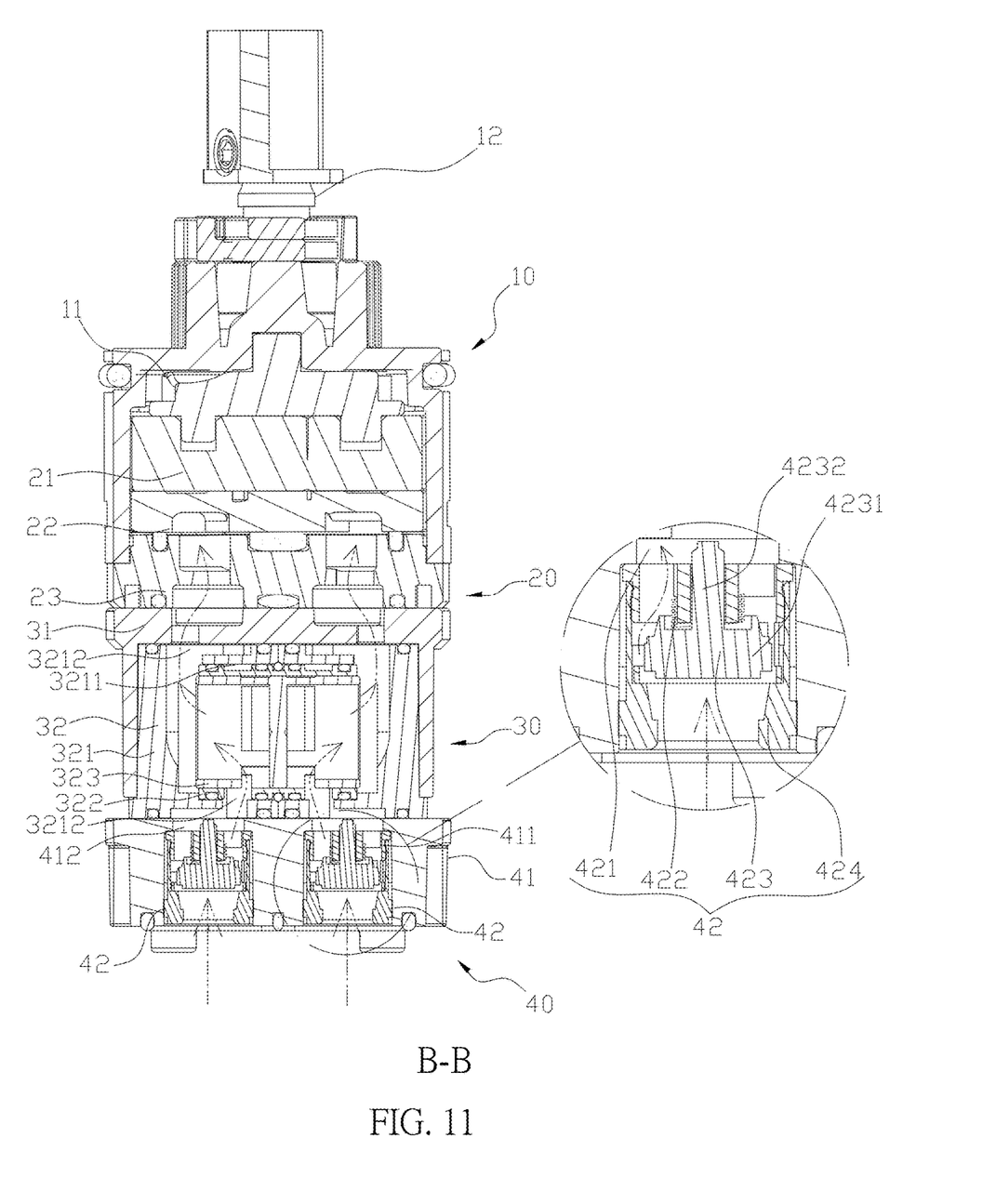
FIG. 11 is a cross-sectional view of the line B-B in FIG. 10 of the preferred embodiment according to present invention.
Figure 12:
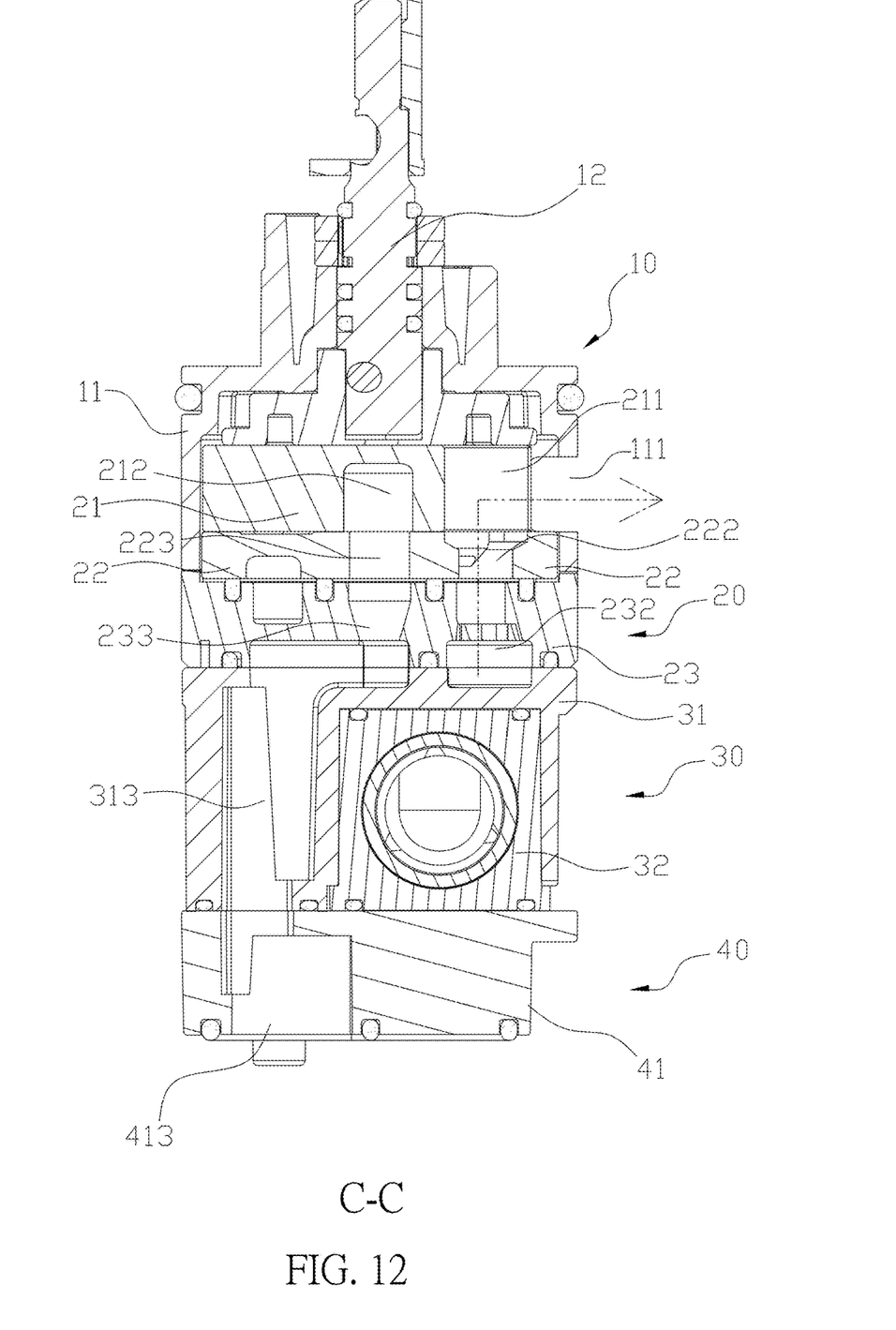
FIG. 12 is a cross-sectional view of the line C-C in FIG. 10 of the preferred embodiment according to present invention.
Figure 13:
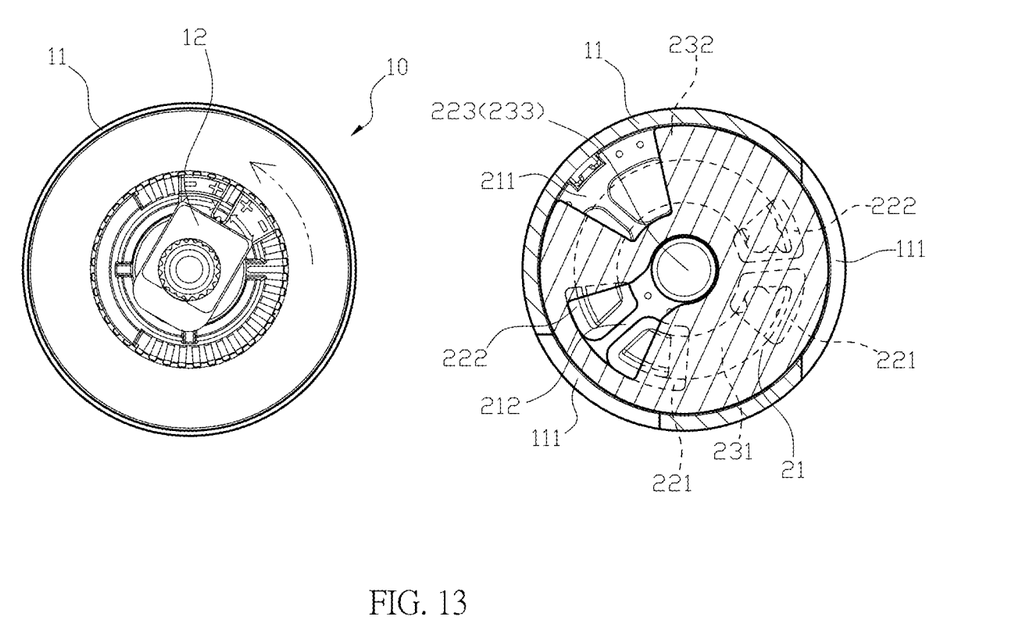
FIG. 13 is a schematic diagram of another usage state of the preferred embodiment according to present invention.
Figure 14:
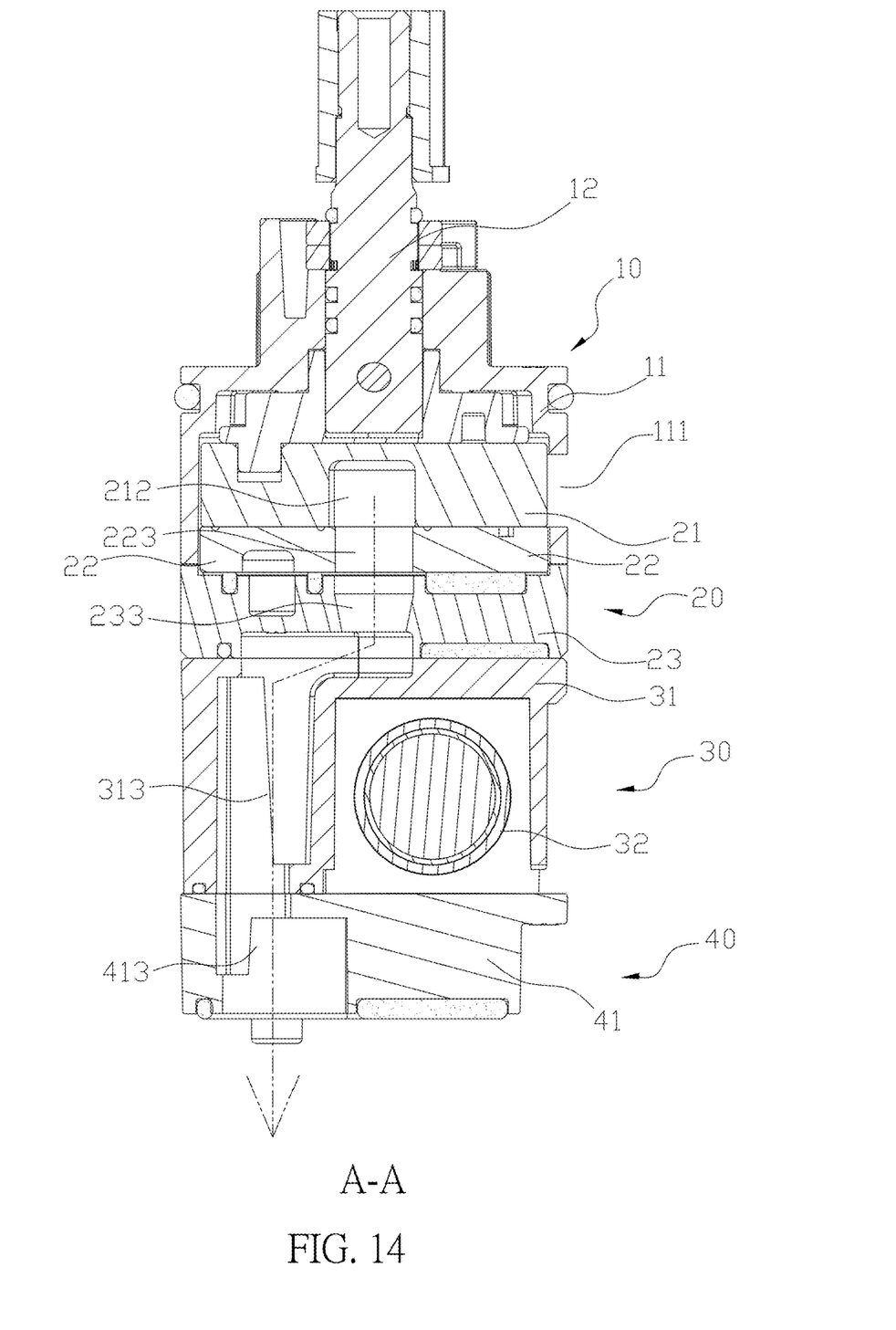
FIG. 14 is a cross-sectional view of the line A-A in FIG. 13 of the preferred embodiment according to present invention.

As shown in FIGS. 10 to 14, with the above structure, hot water flows through a checking valve 42 through the checking hot intake hole 411 into the balancing valve 32, and cold water passes through a checking valve 42 through the checking cold intake hole 412 flows into the balancing valve 32. The cold water and hot water automatically balance the pressure on both sides through the balancing valve 32, and then the hot water passes through the balancing hot intake hole 311, the second hot intake hole 231, and the first hot intake hole. 221 flows to the upper ceramic plate 21, and the cold water passes through the balancing cold intake hole 312, the second cold intake hole 232, and the first cold intake hole 222 flows to the upper ceramic plate 21, as shown in FIG. 10 to FIG. 12. In other words, if the side outlet 211 is connected to the first hot intake hole 221, the first cold intake hole 222, and the side drainage hole 111, the hot and cold water respectively from the first hot intake hole 221 and the first cold intake hole 222 can be mixed and flows out from the side drainage hole 111 through the side outlet 211. As shown in FIGS. 13 and 14, if the bottom outlet 212 is connected to the first hot intake hole 221 and the first cold intake hole 222, the hot and cold water respectively from the first hot intake hole 221 and the first cold intake hole 222 can be mixed and then goes through the bottom outlet 212, the first hot and cold outlet 223, the second hot and cold outlet 233, the balancing hot and cold outlet 313, the checking hot and cold intake hole 413 to flow out.

Figure 9:
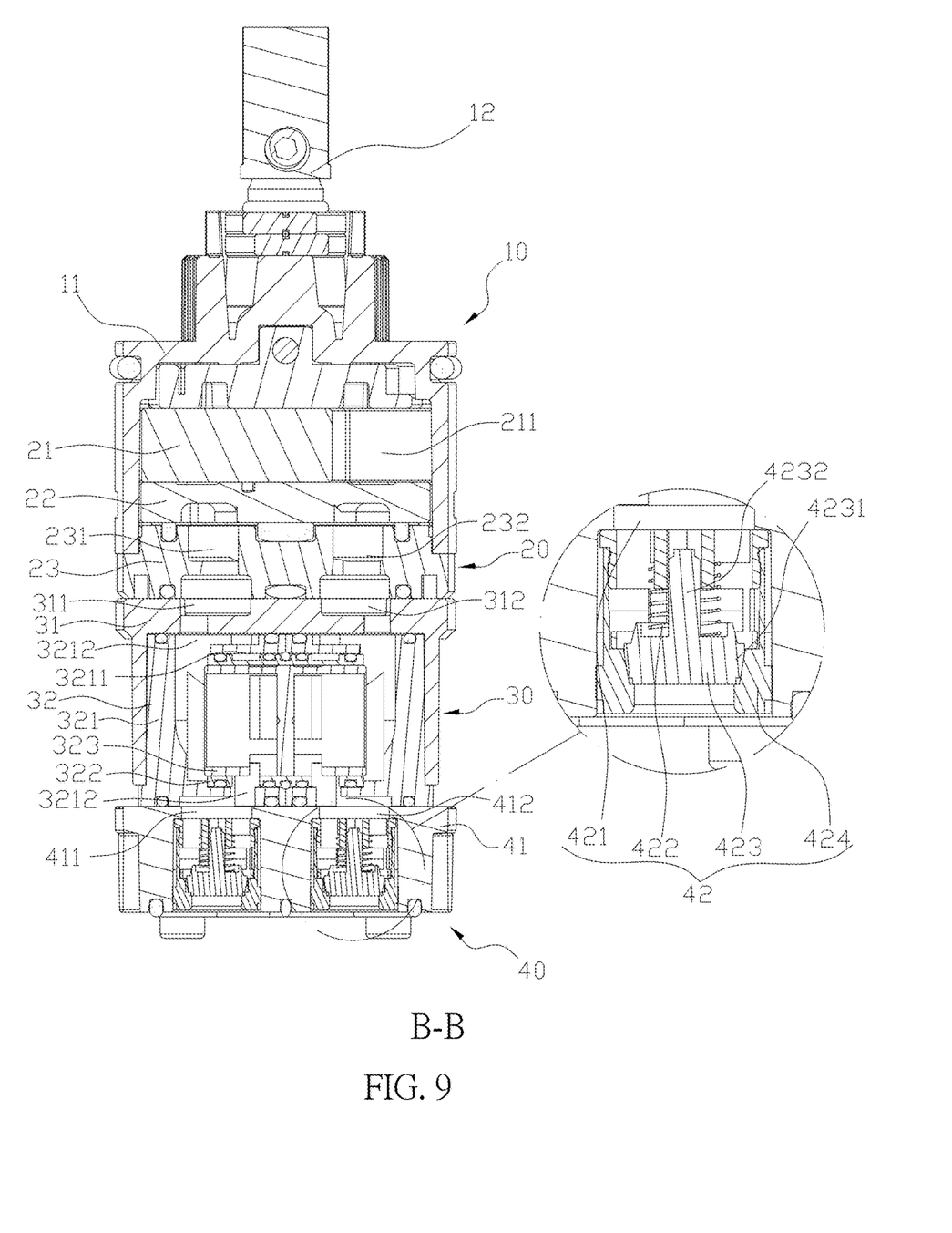
FIG. 9 is a cross-sectional view of the line B-B in FIG. 7 of the preferred embodiment according to present invention.

As shown in FIGS. 9 and 11, the balancing valve 32 has a fixed valve tube 332 and a movable spool mounted 323 in two corresponding accommodation sleeve 321, each of the accommodation sleeve 321 has a horizontal through slot 3211 connected to each other and a water suppling hole 3212 respectively on a top and a bottom surface connected to each other, the fixed valve tube 332 is placed through the horizontal through slot 3211 of the two accommodation sleeves 321, and the movable spool 323 is placed in the fixed valve tube 322. As shown in FIG. 11, the cold and hot water enters from the water suppling hole 3212 into the movable spool 323 to balance the pressure, an then respectively passes through the water suppling hole 3212 into the balancing hot intake hole 311 and the balancing cold intake hole 312.

Figure 4:
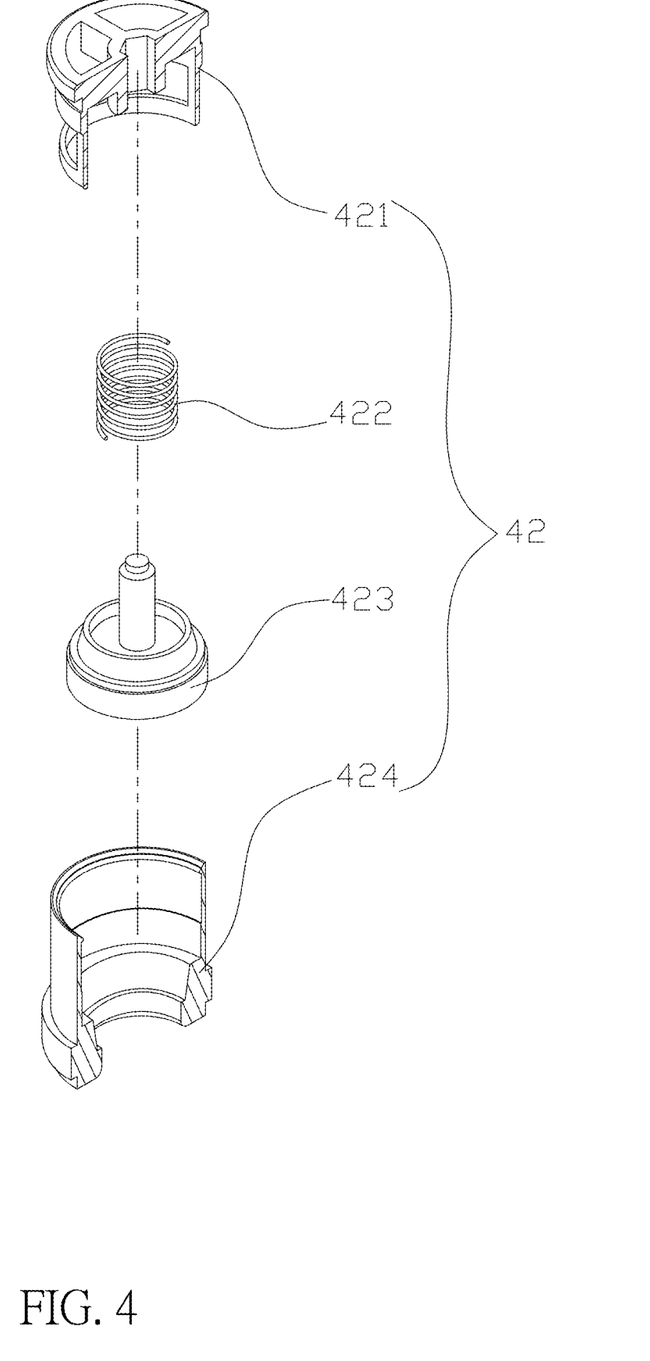
FIG. 4 is an exploded view of the check valve of the preferred embodiment according to the present invention.

As shown in FIGS. 4 and 9, the checking valve 42 has a secured base 421 with a elastic member 422 and a blocking member 423, the blocking member 423 has a water stopper 4231 extending with a guiding rod 4232, the elastic member 422 is jacketed onto the guiding rod 4232 of the blocking member 423, and the secured base 421 of the blocking member 423 the secured base 421 is jacketed with a positioning sleeve 424. As shown in FIG. 11, the cold and hot water flows through the checking valve 42 to push the water stopper 4231, the elastic member 422 pushes the water stopper 4231 back against the positioning sleeve 424 to prevent the water flow reversely.

Figure 5:
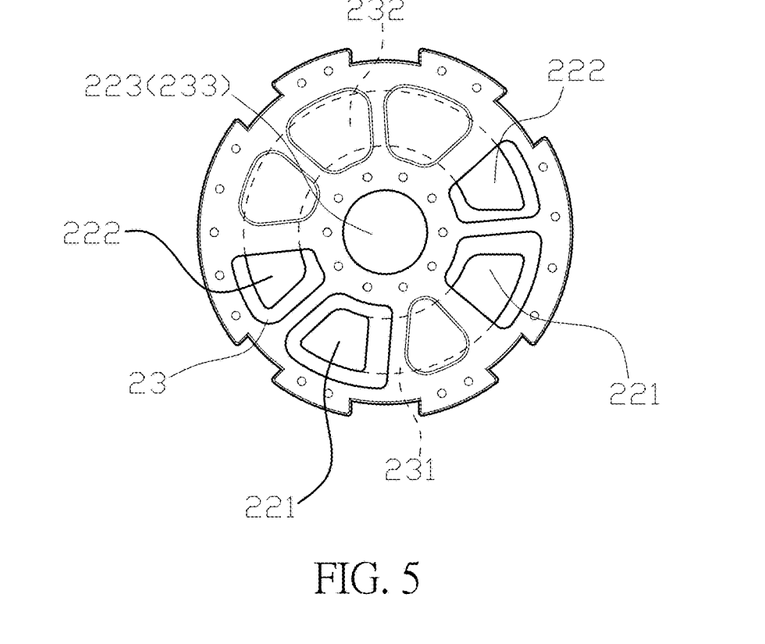
FIG. 5 is a top view of the lower ceramic plate of the preferred embodiment according to present invention.
Figure 6:
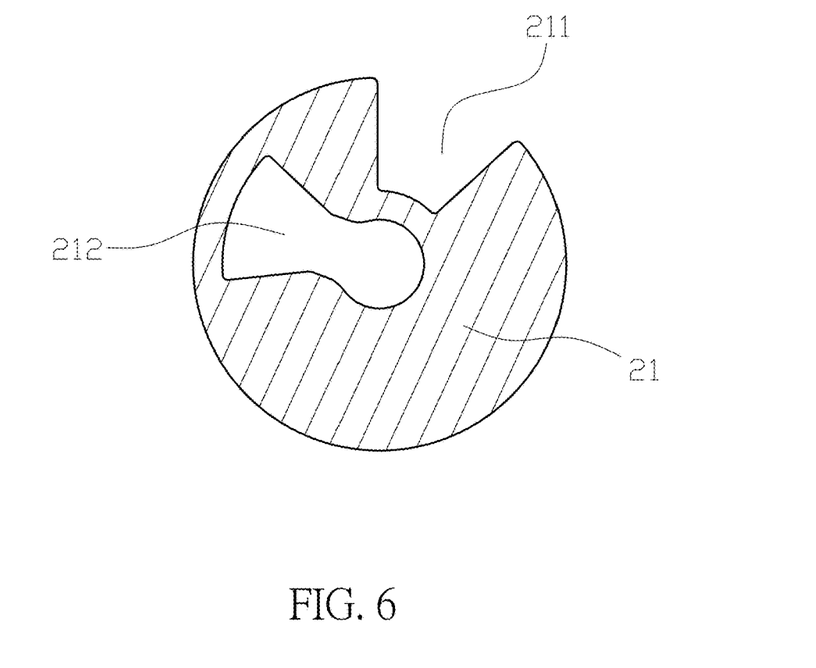
FIG. 6 is a top cross-sectional view of the upper ceramic plate of the preferred embodiment according to present invention.
Figure 7:
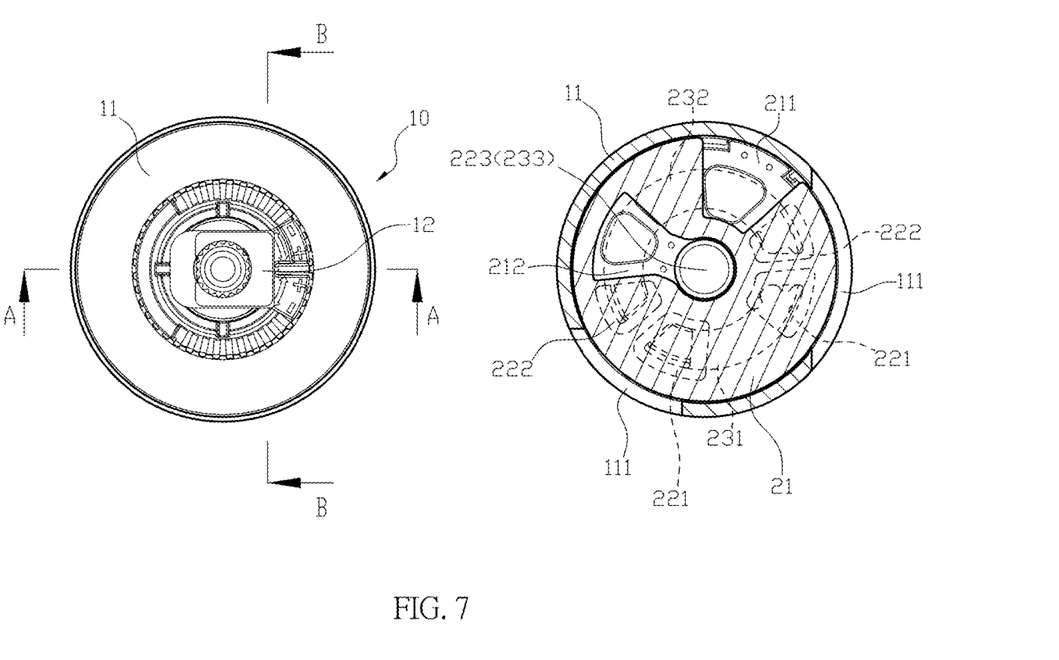
FIG. 7 is a top view and top cross-sectional view of the preferred embodiment according to present invention.
Figure 8:
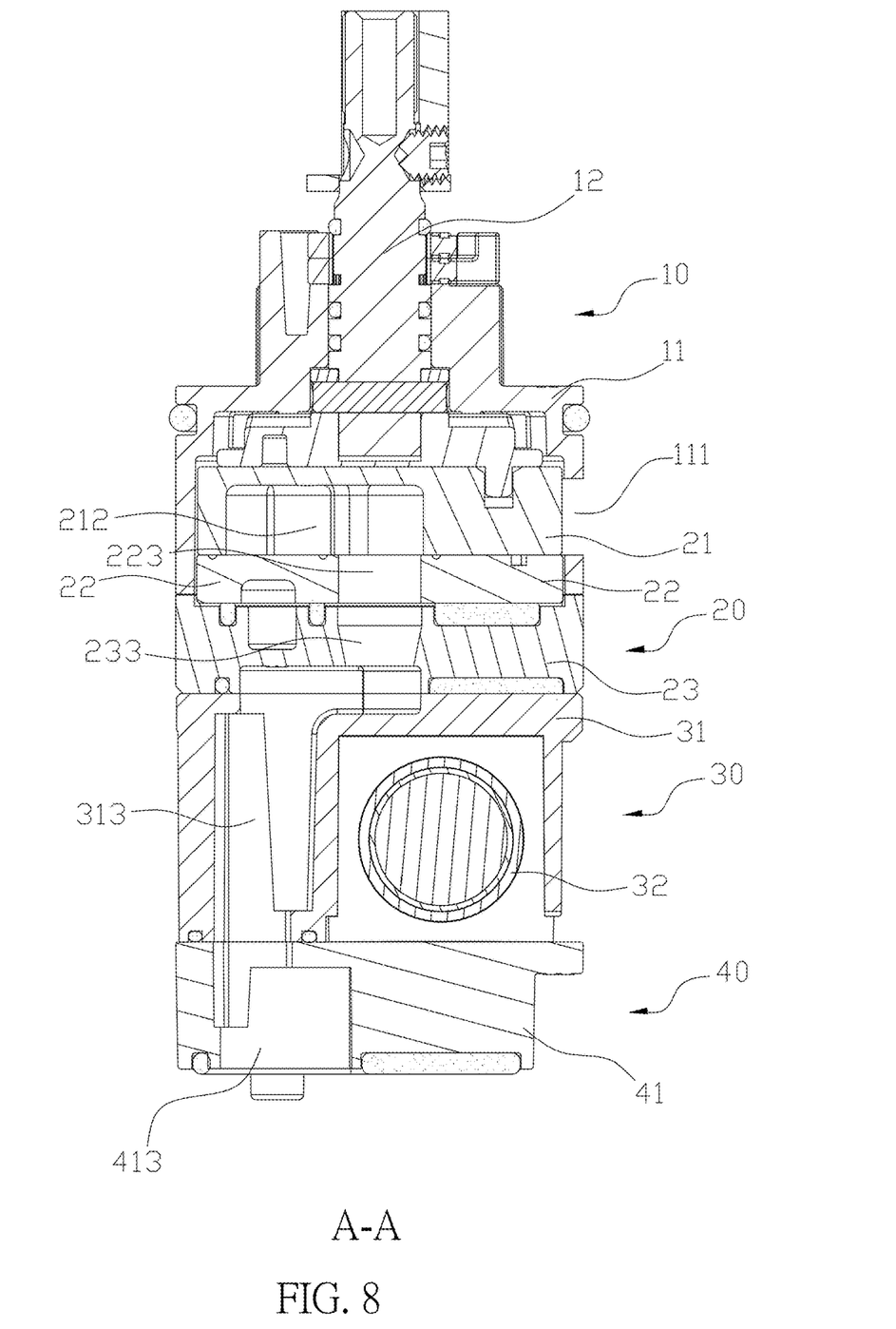
FIG. 8 is a cross-sectional view of the line A-A in FIG. 7 of the preferred embodiment according to present invention.

Furthermore, the lower ceramic plate 22 has a plurality of oil pits 224, on a surface for containing lubrication oil to reduce abrasion between the lower ceramic plate 22 and the upper ceramic plate 21.

Figure 1:
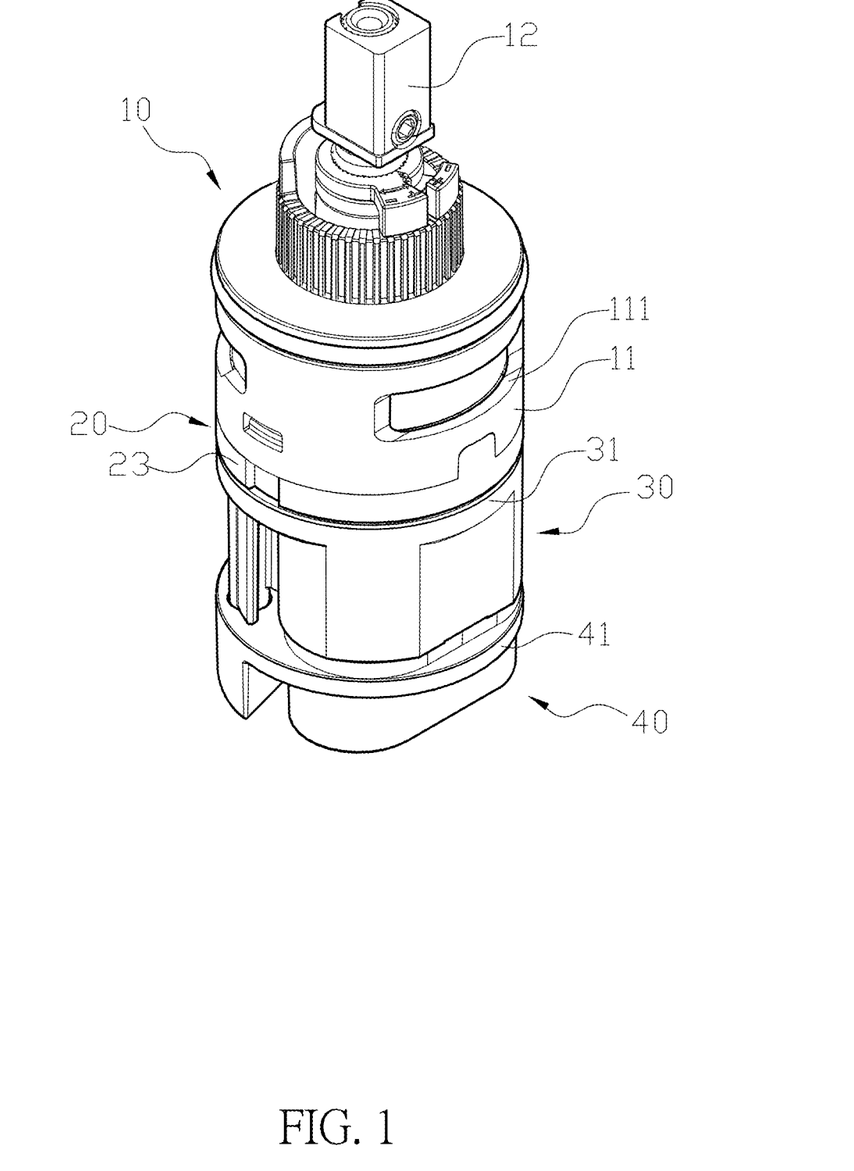
FIG. 1 is a three-dimensional view of a preferred embodiment according to the present invention.
Figure 2:
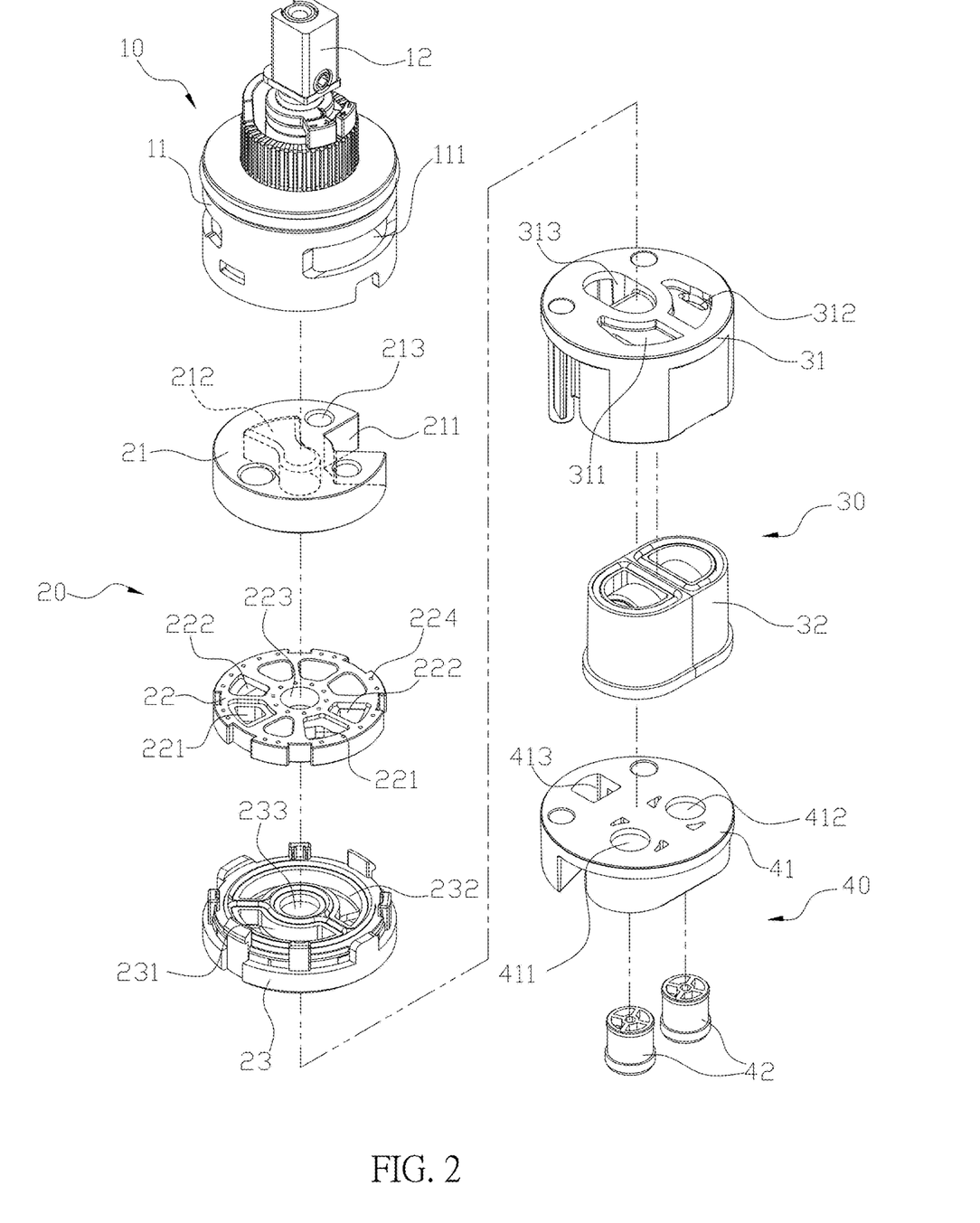
FIG. 2 is an exploded view of the preferred embodiment according to the present invention.
Figure 3:
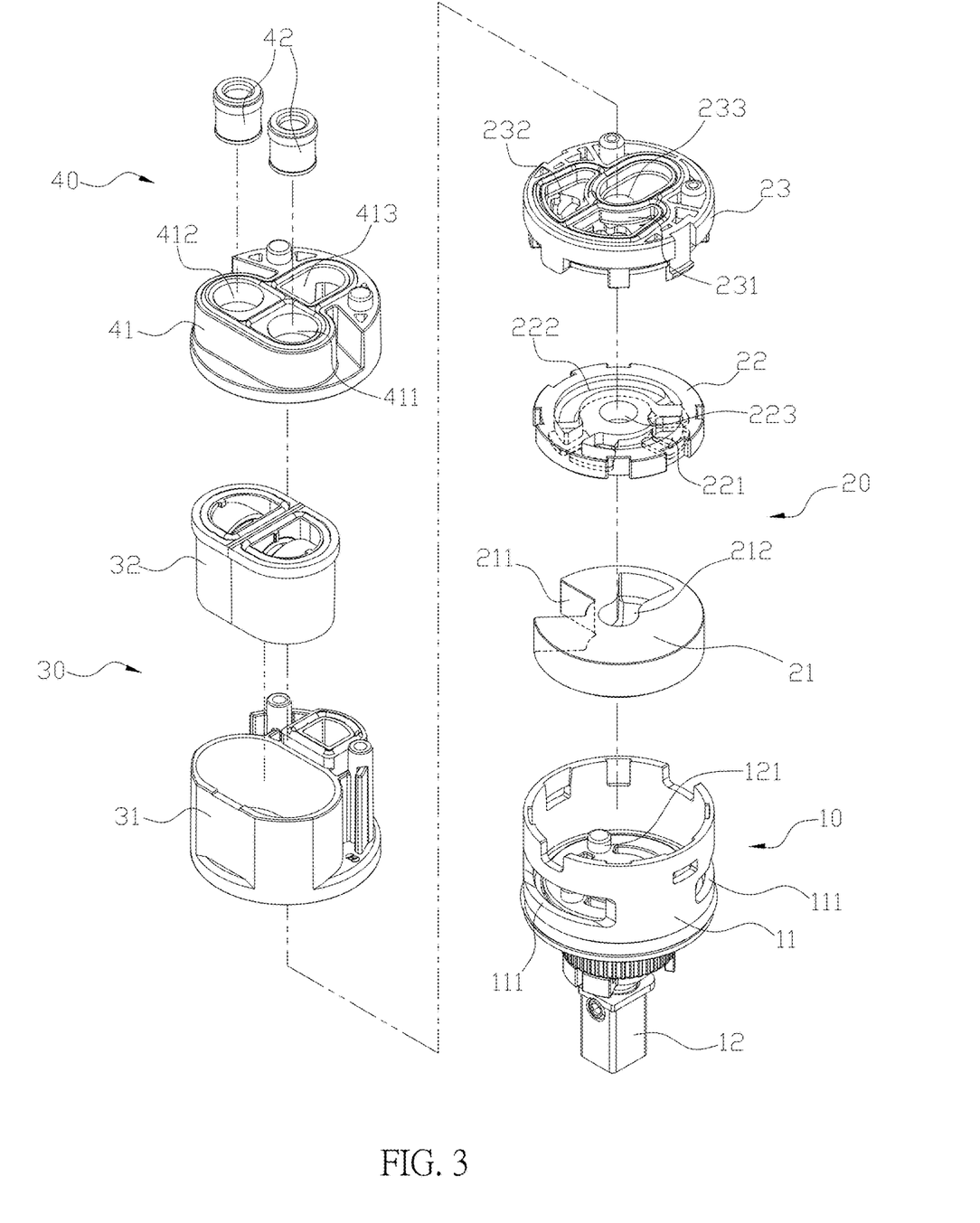
FIG. 3 is an exploded view of another aspect of the preferred embodiment according to the present invention.

As shown in FIGS. 2 and 3, the control rod 12 further has a plurality of flanges 121 at a bottom, and the upper ceramic plate 21 further has a plurality of grooves 213, and the flange 121 engage with the grooves 213 to cause the upper ceramic plate 21 to be driven by the control rod 12.

The ceramic balancing check valve in the present invention that is capable of discharging water from the side through the side outlet 211 or the bottom outlet 212 by rotating the upper ceramic plate 21, and the user can adjust the water temperature by simply rotating the control rod 12 to drive the upper ceramic plate 21 to adjust the area ratio of the side outlet 211 and the bottom outlet 212 versus the first hot intake hole 221 and the first cold intake hole 222, which is convenient. Moreover, the pressure of hot and cold water can be balanced through the balancing valve 32, and the checking valve 42 can avoid the reverse flow of hot and cold water and maintain stable water output.

Although the present invention has been explained in relation to its preferred embodiment, it is to be understood that many other possible modifications and variations can be made without departing from the spirit and scope of invention as hereinafter claimed.

What is claimed is:

1. A ceramic balancing check valve comprising a valve housing, a controller, a balancing valve unit, and a check valve unit; wherein:
   the valve housing has a main body having a hollow bottom and further having two side drainage holes, a control rod disposed on a top of the main body; the controller has an upper ceramic plate, a lower ceramic plate, and a base, the lower ceramic plate secured on the base, the upper ceramic plate capable of rotating relative to the lower ceramic plate, the base secured at the bottom of the main body, and the upper ceramic plate and the lower ceramic plate are disposed in the main body; the control rod is capable of rotating and driving the upper ceramic plate; the upper ceramic plate has a side outlet aligned with the side drainage hole and a bottom outlet; the lower ceramic plate has two first hot intake holes and two first cold intake holes and further has a first hot and cold outlet; the base has a second hot intake hole, a second cold intake hole, and a second hot and cold outlet; the balancing valve unit and the check valve unit are disposed at the bottom of the controller; the balancing valve unit has a balancing valve base and a balancing valve, the balancing valve base has a balancing hot intake hole, a balancing cold intake hole, and a balancing hot and cold outlet are disposed on a top surface of the balancing valve base, and the balancing valve base is combined with the balancing valve; the check valve unit has a check valve base and two check valves; the check valve base has a check hot intake hole, a check cold intake hole, and a check hot and cold intake hole, and the check cold intake hole and the check hot intake hole respectively have a check valve.

2. The ceramic balancing check valve as claimed in claim 1, wherein the balancing valve has a fixed valve tube and a movable spool mounted in two corresponding accommodation sleeves, each of the accommodation sleeves has a horizontal through slot connected to each other and a water supply hole respectively on a top and a bottom surface connected to each other, the fixed valve tube is placed through the horizontal through slots of the two accommodation sleeves, and the movable spool is placed in the fixed valve tube.

3. The ceramic balancing check valve as claimed in claim 1, wherein the check valve has a secured base with an elastic member and a blocking member, the blocking member has a water stopper extending with a guiding rod, the elastic member is jacketed onto the guiding rod of the blocking member, and the secured base is jacketed with a positioning sleeve.

4. The ceramic balancing check valve as claimed in claim 1, wherein the lower ceramic plate has a plurality of oil pits on a surface for containing lubrication oil to reduce abrasion between the lower ceramic plate and the upper ceramic plate.

5. The ceramic balancing check valve as claimed in claim 1, wherein the control rod further has a plurality of flanges at a bottom, the upper ceramic plate further has a plurality of groove at a surface, and the flanges engage with the grooves to cause the upper ceramic plate to be driven by the control rod.

* * * * *